(12) United States Patent
Wu et al.

(10) Patent No.: US 7,809,129 B2
(45) Date of Patent: Oct. 5, 2010

(54) ACOUSTIC ECHO CANCELLATION BASED ON NOISE ENVIRONMENT

(75) Inventors: Jincheng Wu, Naperville, IL (US); Joel Clark, Woodridge, IL (US)

(73) Assignee: Motorola, Inc., Schaumburg, IL (US)

( * ) Notice: Subject to any disclaimer, the term of this patent is extended or adjusted under 35 U.S.C. 154(b) by 546 days.

(21) Appl. No.: 11/848,376

(22) Filed: Aug. 31, 2007

(65) Prior Publication Data

US 2009/0059821 A1  Mar. 5, 2009

(51) Int. Cl.
*H04M 9/08* (2006.01)

(52) U.S. Cl. .................. 379/406.01; 370/201; 370/286; 379/406.07; 379/406.08; 379/406.09; 381/66; 455/63.1; 455/79; 455/570

(58) Field of Classification Search ................. 370/276, 370/286, 289, 201; 375/222; 379/406.01, 379/406.08, 406.14, 406.05, 406.07, 406.09; 381/66; 455/63.1, 79, 570

See application file for complete search history.

(56) References Cited

U.S. PATENT DOCUMENTS

| | | | | |
|---|---|---|---|---|
| 4,645,883 | A * | 2/1987 | Horna et al. ........... | 379/406.08 |
| 5,001,701 | A   | 3/1991 | Gay | |
| 5,315,585 | A * | 5/1994 | Iizuka et al. ................ | 370/289 |
| 5,696,821 | A * | 12/1997 | Urbanski ............... | 379/406.07 |
| 5,771,440 | A * | 6/1998 | Sukhu et al. ............... | 455/63.1 |
| 5,796,819 | A * | 8/1998 | Romesburg ............ | 379/406.09 |
| 5,835,851 | A * | 11/1998 | Rasmusson et al. ........... | 455/79 |
| 5,937,060 | A * | 8/1999 | Oh ........................ | 379/406.14 |
| 6,081,732 | A * | 6/2000 | Suvanen et al. ............. | 455/570 |
| 6,148,078 | A * | 11/2000 | Romesburg ............ | 379/406.07 |
| 6,160,886 | A * | 12/2000 | Romesburg et al. .... | 379/406.05 |
| 6,163,608 | A * | 12/2000 | Romesburg et al. .... | 379/406.01 |
| 6,185,300 | B1 * | 2/2001 | Romesburg ............ | 379/406.09 |
| 6,282,176 | B1 * | 8/2001 | Hemkumar .................. | 370/276 |
| 6,351,532 | B1 * | 2/2002 | Takada et al. .......... | 379/406.01 |
| 6,434,110 | B1 * | 8/2002 | Hemkumar .................. | 370/201 |
| 6,480,610 | B1   | 11/2002 | Fang et al. | |
| 6,522,746 | B1   | 2/2003 | Marchok et al. | |

(Continued)

FOREIGN PATENT DOCUMENTS

EP    0884886 A2    12/1998

(Continued)

OTHER PUBLICATIONS

Jia, et al., Subband Doubletalk Detector for Acoustic Echo Cancellation Systems, Apr. 2003, pp. 604-607, 0-7803-7663-3/03, IEEE.

(Continued)

*Primary Examiner*—Gerald Gauthier (57) ABSTRACT

A method (200) of cancelling echo in a duplex communication device (100). The method can include detecting a level of noise present on an uplink signal path (104), generating a noise classifier (194) based on the detected level of noise, detecting whether uplink audio is present on the uplink signal path (104) and detecting whether downlink audio is present on a downlink signal path (102). The method further can include generating a double talk flag (136) based at least on the noise classifier, whether uplink audio is present on the uplink signal path, and whether downlink audio is present on the downlink signal path. In addition, the double talk flag, the noise classifier and an uplink signal can be processed to generate an output signal (120) having reduced echo.

22 Claims, 4 Drawing Sheets

U.S. PATENT DOCUMENTS

| | | | |
|---|---|---|---|
| 6,545,985 B1* | 4/2003 | Suvanen | 370/286 |
| 6,574,337 B1* | 6/2003 | Kawada | 379/406.08 |
| 6,580,795 B1 | 6/2003 | Li et al. | |
| 6,799,062 B1* | 9/2004 | Piket et al. | 455/569.1 |
| 6,947,552 B2* | 9/2005 | Takada | 379/406.08 |
| 7,039,181 B2 | 5/2006 | Marchok et al. | |
| 7,099,458 B2* | 8/2006 | Piket et al. | 379/406.05 |
| 7,155,018 B1* | 12/2006 | Stokes et al. | 381/66 |
| 7,221,659 B1* | 5/2007 | Surazski et al. | 370/286 |
| 7,477,682 B2* | 1/2009 | LeBlanc | 375/222 |
| 7,577,248 B2* | 8/2009 | McCree | 379/406.08 |
| 7,643,630 B2* | 1/2010 | McCree et al. | 379/406.08 |
| 7,680,265 B2* | 3/2010 | Piket et al. | 379/406.08 |
| 2005/0129226 A1* | 6/2005 | Piket et al. | 379/406.01 |
| 2006/0018458 A1* | 1/2006 | McCree et al. | 379/406.01 |
| 2007/0121925 A1* | 5/2007 | Cruz-Zeno et al. | 379/406.01 |
| 2008/0101622 A1 | 5/2008 | Sugiyama | |
| 2008/0292109 A1* | 11/2008 | Trump et al. | 381/66 |
| 2009/0028355 A1* | 1/2009 | Ishiguro | 381/66 |
| 2009/0036170 A1* | 2/2009 | Unno et al. | 455/570 |
| 2009/0059821 A1* | 3/2009 | Wu et al. | 370/286 |

FOREIGN PATENT DOCUMENTS

WO    2006049260 A1    11/2006

OTHER PUBLICATIONS

Weiss, et al., Steady-State Performance Limitations of Subband Adaptive Filters, IEEE, IEEE Transactions on Signal Processing, Sep. 2001, pp. 1982-1991, vol. 49, No. 9, IEEE.

Harteneck, et al., Design of Near Perfect Reconstruction Oversampled Filter Banks for Subband Adaptive Filters, IEEE Transactions on Circuits and Systems—II: Analog and Digital Signal Processing, Aug. 1999, pp. 1081-1085, vol. 46, No. 8, IEEE.

Le Bouquin Jeannes, et al., Combined Noise and Echo Reduction in Hands-Free Systems: a Survey, IEEE Transactions on Speech and Audio Processing, Nov. 2001, pp. 808-820, vol. 9, No. 8, IEEE.

Ting, et al., Adaptive Signal Processing for ESM, Communications Signal Processing website: http://www.ee.qub.ac.uk/dsp/csp/projects.html, Accessed Aug. 30, 2007, 5 pgs.

Dyba, et al., Motorola Packet Telephony Echo Cancellation Solutions, Jul. 2003, White Paper Series, http://www.freescale.com/files/dsp/doc/white_paper/PTECANWP.pdf, 55 pgs.

* cited by examiner

ACOUSTIC ECHO CANCELLATION BASED ON NOISE ENVIRONMENT

BACKGROUND OF THE INVENTION

1. Field of the Invention

The present invention generally relates to duplex communications and, more particularly, to echo cancellation.

2. Background of the Invention

During a duplex communication session, for instance between two telephones, acoustic echo arises when output audio signals generated by a first device's loudspeaker are detected by the device's microphone. If not addressed, the acoustic echo will be communicated back to a second device that was the original source of the audio signal, which is undesirable.

Echo cancellers using linear and non-linear processing techniques oftentimes are used to reduce acoustic echo. Such echo cancellers typically include a double talk (DBTK) detector. A DBTK detector typically generates a DBTK flag to indicate whether there are is an audio signal on a communication device's downlink signal path, on the communication device's uplink signal path, or both on the downlink and uplink signal paths. When the DBTK flag indicates that an audio signal is present on the downlink signal path or both on the downlink and uplink signal paths, the echo canceller generally will implement some form of echo cancellation.

Unfortunately, in addition to echo, other noise may be present in communication signals, for instance background noise when a communication device is used in a noisy environment. Such noise can disrupt operation of an echo canceller. Indeed, noise oftentimes causes improper DBTK detection, which can result in improper echo cancellation, as well as introduce other signal processing errors.

SUMMARY OF THE INVENTION

The present invention relates to an echo canceller. The echo canceller can include a noise environment classifier that detects a level of noise present on an uplink signal path and generates a noise classifier based on the level of noise. The echo canceller also can include a double talk detector that detects whether uplink audio is present on the uplink signal path, detects whether downlink audio is present on a downlink signal path, and generates a double talk flag based at least on the noise classifier, whether uplink audio is present on the uplink signal path and whether downlink audio is present on the downlink signal path. The echo canceller also can include a non-linear processing that processes the double talk flag, the noise classifier and an uplink signal to generate an output signal having reduced echo.

The present invention also relates to a method of cancelling echo in a duplex communication device. The method can include detecting a level of noise present on an uplink signal path, generating a noise classifier based on the detected level of noise, detecting whether uplink audio is present on the uplink signal path and detecting whether downlink audio is present on a downlink signal path. The method further can include generating a double talk flag based at least on the noise classifier, whether uplink audio is present on the uplink signal path, and whether downlink audio is present on the downlink signal path. In addition, the double talk flag, the noise classifier and an uplink signal can be processed to generate an output signal having reduced echo.

The present invention further relates to a method of cancelling echo in a duplex communication device, which can include detecting a level of noise present on an uplink signal path, generating a noise classifier by classifying the level of noise present on the uplink signal path into at least one noise classification selected from a plurality of defined noise classifications, detecting whether uplink audio is present on the uplink signal path, and detecting whether downlink audio is present on a downlink signal path. In addition, a double talk flag can be generated based at least on the noise classifier, whether uplink audio is present on the uplink signal path, and whether downlink audio is present on the downlink signal path. The double talk flag, the noise classifier and an uplink signal can be processed to generate an output signal having reduced echo.

BRIEF DESCRIPTION OF THE DRAWINGS

Preferred embodiments of the present invention will be described below in more detail, with reference to the accompanying drawings, in which.

DETAILED DESCRIPTION

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

Figure 1:
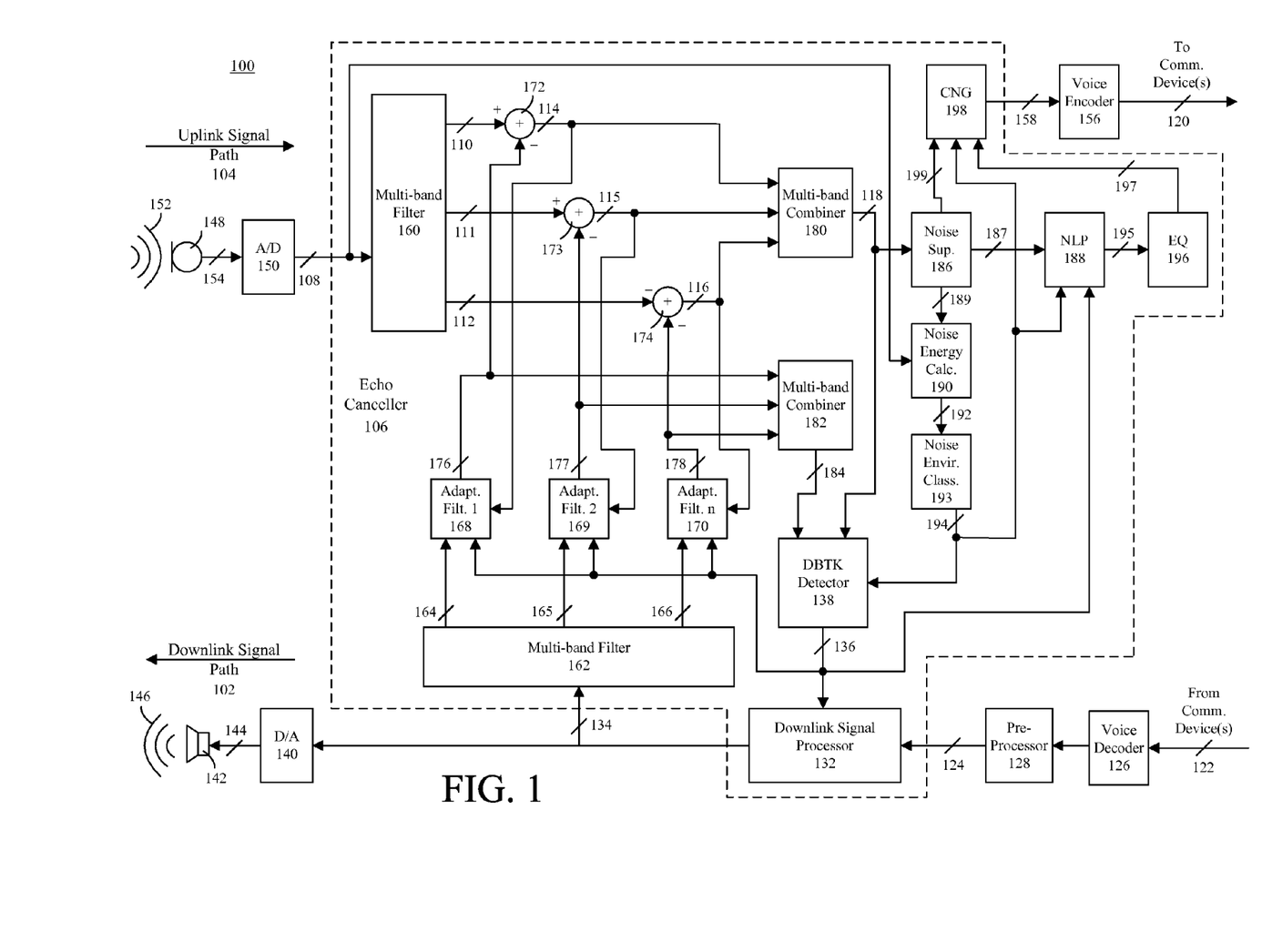
FIG. 1 depicts a block diagram of a communication device that is useful for understanding the present invention.

FIG. 1 depicts a block diagram of a communication device 100 that is useful for understanding the present invention. The communication device 100 can be a duplex communication device, which may include a downlink signal path 102 and an uplink signal path 104. The communication device 100 can include an echo canceller 106 that receives a near end input audio signal 108 (hereinafter "first input signal"), and divides the first input signal 108 into a plurality of first sub-band signals 110, 111, 112. The echo canceller 106 then can process the sub-band signals 110-112 to generate sub-band signals 114, 115, 116 having reduced echo content, but including uplink audio when present, and re-combine the sub-band signals 114-116 to generate a combined uplink signal 118. The combined uplink signal 118 may be processed to reduce the echo further and to reduce noise. A resulting output signal 120 then can be communicated to one or more other communication devices. As used herein, the term "uplink audio" means audio, other than echo or noise, that is present in an uplink signal on the uplink signal path 104. Similarly, as used herein, the term "downlink audio" means audio, other than echo or noise, that is present in a downlink signal on the downlink signal path 102.

The processing implemented on the sub-band signals 110-112 and on the combined uplink signal 118 can be dynamically optimized for a level of noise detected on the uplink signal path 104, thereby optimizing echo cancellation based on the environment in which the communication device 100 is used. For example, when the communication device 100 is operated in a quiet environment, echo may be quite distinguishable from the uplink audio and a relatively high amount of echo cancellation can be implemented. In contrast, when the communication device 100 is operated in a relatively noisy environment, echo may not be as distinguishable from the uplink audio, and thus a lesser amount of echo cancellation may be implemented.

For the purposes of clarity, three sub-band signals 110-112 are depicted in the echo canceller 106, but the invention is not limited in this regard. Indeed, the echo canceller 106 can divide the first input signal 108 into any number of sub-band signals. For example, the echo canceller 106 can divide the first input signal 108 into fewer than three sub-band signals or more than three sub-band signals.

Various arrangements of the communication device 100 now will be described with particularity. Referring to the downlink signal path 102, one or more signal processing components may be provided to process a downlink signal 122 to generate a downlink signal 124. For example, the downlink signal path 102 can include a voice decoder 126 and a pre-processor 128. Such components and their operation are known to the skilled artisan. Additional components (not shown) also can be included on the downlink signal path 102 to process the downlink signal 122, and the invention is not limited in this regard.

Further, the echo canceller 106 can include a downlink signal processor 132 on the downlink signal path 102. The downlink signal processor 132 can adjust the gain and/or equalize the downlink signal 124 to generate an adjusted downlink signal (hereinafter "second input signal") 134. Such gain control/equalization can be based on a double talk (DBTK) flag 136 received from a DBTK detector 138, as well as a level of noise present on the uplink signal path 104, as will be described in greater detail.

The downlink signal path 102 also may include a digital to analog (D/A) converter 140 and an output audio transducer 142 (e.g. loudspeaker). The D/A converter 140 can convert the second input signal 134 into an analog output audio signal 144, which may be communicated to the output audio transducer 142 to generate an output acoustic signal 146. The output acoustic signal 146 can be presented to a user of the communication device 100.

The uplink signal path 104 can include an input audio transducer 148 (e.g. microphone), an analog to digital (A/D) converter 150 and the echo canceller 106. The input audio transducer 148 can receive an input acoustic signal 152 from the user and generate a corresponding analog input audio signal 154. The A/D converter 150 can convert the analog input audio signal 154 into the first input signal 108, which may be a digital signal. Further, a voice encoder 156 and other components which are known to the skilled artisan, such as a transceiver and/or other suitable signal processing components (not shown), can be provided to process an output signal 158 generated by the echo canceller 106 to generate the output signal 120.

In addition to the previously noted DBTK detector 138 and the downlink signal processor 132, the echo canceller 106 can include a first multi-band filter 160 that divides the first input signal 108 into the plurality of sub-band signals 110-112, and a second multi-band filter 162 that divides the second input signal 134 into a plurality of sub-band signals 164, 165, 166. The first and second multi-band filters 160, 162 can be, for example, Discrete Fourier Transform (DFT) polyphase analyzers, although the invention is not limited in this regard and any other suitable multi-band filters can be used.

The echo canceller 106 also can include a plurality of adaptive filters 168, 169, 170 and a plurality of adders 172, 173, 174. The number of the adaptive filters 168-170 and adders 172-174 can correspond to the number of sub-band signals 110-112 processed by the echo canceller 106. In that regard, the adaptive filter 168 and adder 172 can process sub-band signal 110 and/or sub-band signal 164 on a first sub-band. Similarly, the adaptive filter 169 and adder 173 can process sub-band signal 111 and/or sub-band signal 165 on a second sub-band. Further, the adaptive filter 170 and adder 174 can process sub-band signal 112 and/or sub-band signal 166 on a third sub-band, and so on.

The adders 172-174 each can generate a respective sub-band signal 114-116. The sub-band signal 114 can be a difference of the sub-band signal 110 and the sub-band signal 164, the sub-band signal 115 can be a difference of the sub-band signal 111 and the sub-band signal 165, and the sub-band signal 116 can be a difference of the sub-band signal 112 and the sub-band signal 166. In one arrangement, the filtered versions 176, 177, 178 of the sub-band signals 164, 165, 166, respectively, can be processed by the adders 172-174 to generate the sub-band signal 114-116. Filtering of the sub-band signals 164-166 will be described herein in greater detail.

Each of the sub-band signals 114-116 can be communicated to a multi-band combiner 180, which can combine the sub-band signals 114-116 to generate the combined uplink signal 118. Similarly, each of the filtered sub-band signals 176-178 can be communicated to a multi-band combiner 182 to generate a combined filtered signal 184. In one arrangement, the first and second multi-band combiners 180, 182 can be DFT polyphase synthesizers, although other types of multi-band combiners can be used and the invention is not limited in this regard.

The combined uplink signal 118 and the combined filtered signal 184 can be communicated to the DBTK detector 138. In addition, the combined uplink signal 118 also can be communicated to a noise suppressor 186. The noise suppressor 186 can comprise, for example, a noise filter. The noise suppressor 186 can suppress noise signals contained in the combined uplink signal 118 to generate uplink signal 187, and communicate the uplink signal 187 to the non-linear processor 188.

The noise suppressor 186 also can generate an audio activity flag 189 indicating whether uplink audio is present on the uplink signal path 104, and communicate the audio activity flag 189 to a noise energy calculator 190. When the audio activity flag 189 indicates there is no uplink audio on the uplink signal path 104, the noise energy calculator 190 can determine an amount of noise energy contained on the uplink signal path 104 (e.g. in the first input signal 108 and/or in the combined uplink signal 118). The noise energy calculator 190 then can communicate a noise energy indicator 192 representing the amount of noise energy to a noise environment classifier 193. When the audio activity flag 189 indicates there is uplink audio on the uplink signal path 104, the noise energy calculator 190 can cease determining the amount of noise energy on the uplink signal path 104. At such time, the noise energy indicator 192 can be frozen to a value generated before uplink audio was detected on the uplink signal path 104.

The noise environment classifier 193 can generate a noise classification 194 based on the indicator 192. For example, if the noise indicator 192 indicates a noise energy below a first threshold value, the noise environment classifier 193 can classify the noise as low. If the noise indicator 192 indicates a noise energy equal to or greater than the first threshold value, but below a second threshold value, the noise environment classifier 193 can classify the noise as medium. If the noise indicator 192 indicates a noise energy equal to or greater than a third threshold value, the noise environment classifier 193 can classify the noise as high. Nonetheless, it should be noted that the present invention is not limited to the three noise levels discussed in this example, and the noise environment classifier 193 also can classify noise energy levels into fewer than three noise levels or greater than three noise levels. The noise environment classifier 193 can communicate a noise classification 194 to the DBTK detector 138, to the non-linear processor 188 and to the comfort noise generator 198.

In addition to the noise classification 194, the DBTK detector 138 also can receive the combined uplink signal 118 and the combined filtered signal 184, as noted. Based on the combined uplink signal 118 and filtered signal 184, the DBTK detector 138 can detect whether audio signals (other than noise and echo) are present on the downlink signal path 102, on the uplink signal path 104, or both on the downlink signal path and the uplink signal path. The DBTK flag 136 generated by the DBTK detector 138 can indicate such detection, as well as the noise classification 194. Processing of the noise classification 194, the combined uplink signal 118 and the combined filtered signal 184 to generate the DBTK flag 136 is described in greater detail with reference to FIG. 4.

Still referring to FIG. 1, the DBTK detector 138 can generate the DBTK flag 136 corresponding to such determinations. For example, the DBTK flag 136 can be set to a first value if the DBTK detector 138 detects audio present on the combined uplink signal 118 (e.g. the communication device 100 is operating in uplink mode), a second value if the DBTK detector 138 detects audio present on the combined filtered signal 184 (e.g. the communication device 100 is operating in downlink mode), and a third value if the DBTK detector 138 detects audio present on the combined uplink signal 118 and the combined filtered signal 184 (e.g. the communication device 100 is simultaneously operating in uplink mode and downlink mode).

The DBTK detector can communicate the DBTK flag 136 to the downlink signal processor 132, as noted. If the DBTK flag 136 indicates that downlink audio is present on the downlink signal path 102, gain or spectrum enhancement can be applied to improve the intelligibility of the downlink audio contained in the downlink signal 124 and/or increase the level of the downlink signal 124. In one arrangement, the noise classification 194 also can be communicated to the downlink signal processor 132, and the spectrum enhancement and/or gain that is applied to the downlink signal 124 can be based on the noise classification 194. For example, if the noise classification 194 indicates a high level of noise, a greater amount of spectrum enhancement and/or gain can be applied to the downlink signal 124 in comparison to a situation in which the noise classification indicates little or no noise. The noise classification 194 can be communicated to the downlink signal processor 132 from the DBTK detector 138 or from the noise environment classifier 193.

The DBTK detector also can communicate the DBTK flag 136 to the adaptive filters 168-170, each of which can be communicatively linked to a respective adder 172-174 to form a closed loop control system in which the respective sub-band signals 114-116 provide feedback to the adaptive filters 168-170. This feedback may be processed by the adaptive filters 168-170, along with the DBTK flag 136, to filter the respective sub-band signals 164-166. The sub-band signals 164-166 can be filtered to generate the filtered sub-band signals 176-178 which are properly time-aligned with the sub-band signals 110-112 when there is echo in the uplink path, thus improving performance of the DBTK detector 138. For example, the adaptive filters 168-170 can add delay to the sub-band signals 164-166. The adaptive filters 168-170 also can adjust the magnitude of the sub-band signals 176-178 to closely match the magnitude of the sub-band signals 110-112, thereby minimizing the magnitude of the respective sub-band signals 114-116. In that regard, the filtered sub-band signals 176-178 can be processed by the adders 172-174 to generate updated sub-band signals 114-116. Any other of a variety of filtering techniques can be applied to the sub-band signals 164-166 and the invention is not limited in this regard.

In one arrangement, the adaptive filters 168-170 each can include a normalized least means square (NLMS) algorithm that updates filter coefficients for filtering the sub-band signals 164-166. The filter coefficients can be updated based on the DBTK flag 136 and the respective sub-band signals 110-112, 164-166 and 114-116. In one arrangement, the coefficients updated by the NLMS algorithms also can be based on the noise classification 194. The noise classification 194 can be communicated to the adaptive filters 168-170 from the DBTK detector 138 or from the noise environment classifier 193.

By way of example, if the noise classification 194 indicates a low level of noise and the DBTK flag 136 indicates that audio is contained on the downlink signal path 102 and not the uplink signal path 104, the filter coefficients can be updated using an NLMS algorithm with a first step size. If the DBTK flag 136 indicates that audio is contained on both the downlink signal path 102 and the uplink signal path 104, the filter coefficients can be updated by the NLMS algorithm using a second step size. If the DBTK flag 136 indicates that audio is contained on the uplink signal path 104 and not the downlink signal path 102, the filter coefficients can be updated by the NLMS algorithm using a third step size. The adaptive coefficient can be updated in a similar manner if the noise classification 194 indicates medium level of noise or a high level of noise. The step sizes for a medium noise level may be different than the step sizes for a low noise level, and the step sizes for a high noise level may be different than the step sizes for low and medium noise levels.

As used herein, the terms first, second and third merely indicate that the step sizes are different from one another, but not which step sizes are largest or smallest. As is known to those skilled in the art, the step size used by the NLMS algorithm to generate the filter coefficients can affect how much the filter coefficients change with respect to time. For instance, using a larger step size can result in a greater coefficient change with respect to time in comparison to using a smaller step size.

The DBTK detector 138 also can communicate the DBTK flag 136 to the non-linear processor 188. The non-linear processor 188 can select an amount of attenuation to apply to the uplink signal 187 to further reduce echo that may still be present on the uplink signal 187 and generate an uplink signal 195. The amount of attenuation that is selected can be based on the DBTK flag 136 and the noise classification 194.

For instance, assume that the DBTK flag 136 indicates the communication device 100 is operating in downlink mode (e.g. downlink audio is present on the downlink signal path 102), but there is no uplink audio present on the uplink signal path 104. If the noise classification 194 indicates that a low level of noise is present in the first uplink signal 108, the non-linear processor 188 can apply a first level of attenuation to the uplink signal 187. If the noise classification 194 indicates that a medium level of noise is present in the first uplink signal 108, the non-linear processor 188 can apply a second level of attenuation to the uplink signal 187. If, however, the noise classification 194 indicates that a high level of noise is present in the first uplink signal 108, the non-linear processor 188 can apply a third level of attenuation to the uplink signal 187.

Now assume that the DBTK flag 136 indicates the communication device 100 is operating both in downlink mode and uplink mode (e.g. downlink audio is present on the downlink signal path 102 and the uplink audio is present on the uplink signal path 104). If the noise classification 194 indicates that a low level of noise is present in the first uplink signal 108, the non-linear processor 188 can apply a fourth level of attenuation to the uplink signal 187. If the noise classification 194 indicates that a medium level of noise is present in the first uplink signal 108, the non-linear processor 188 can apply a fifth level of attenuation to the uplink signal 187. If the noise classification 194 indicates that a high level of noise is present in the first uplink signal 108, the non-linear processor 188 can apply a sixth level of attenuation to the uplink signal 187.

In another example, assume that the DBTK flag 136 indicates the communication device 100 is operating in uplink mode (e.g. downlink audio is not present on the downlink signal path 102, but there is uplink audio present on the uplink signal path 104). If the noise classification 194 indicates that a low level of noise is present in the first uplink signal 108, the non-linear processor 188 can apply a seventh level of attenuation to the uplink signal 187. If the noise classification 194 indicates that a medium level of noise is present in the first uplink signal 108, the non-linear processor 188 can apply an eighth level of attenuation to the uplink signal 187. If, however, the noise classification 194 indicates that a high level of noise is present in the first uplink signal 108, the non-linear processor 188 can apply a ninth level of attenuation to the uplink signal 187.

In these examples, the terms first, second, third, fourth, fifth, sixth, seventh, eight and ninth need not indicate a particular order in which attenuation is increased or decreased based on the DBTK flag 136 and noise classification 194. Rather, such terms are presented merely to indicate that for each particular pair of DBTK flag 136 and noise classification 194 values, a particular level of attenuation can be selected. Moreover, as noted, any number of noise classification levels can be assigned and the invention is not limited in this regard. Table I depicts an example of attenuation levels that can be assigned based on the previous example.

TABLE I

| | Attenuation Applied | | |
|---|---|---|---|
| | Low Noise | Medium Noise | High Noise |
| Downlink Mode Only | 25 dB | 15 dB | 12 dB |
| Downlink and Uplink Mode | 6 dB | 3 dB | 0 dB |
| Uplink Mode Only | 0 dB | 3 dB | 6 dB |

The non-linear processor 188 can communicate the uplink signal 195 to an equalizer 196, which can equalize the uplink signal 195, for instance to emphasize audio frequencies common to the uplink audio (e.g. audio frequencies common in speech), while minimizing the effect of extraneous signals (e.g. background sounds, noise, etc.). The equalizer 196 can communicate an equalized uplink signal 197 to a comfort noise generator 198.

The comfort noise generator also can receive the noise classification 194 from the noise environment classifier 193, as noted, and a signal 199 from the noise suppressor 186. The signal 199 can include the audio activity flag 189 as well as noise detected on the combined uplink signal 118. When the audio activity flag 189 indicates there is uplink audio present on the uplink signal path 104, the comfort noise generator 198 can pass the uplink signal 197 to the voice encoder 156 as the output signal 158. When the audio activity flag 189 indicates there is no uplink audio present on the uplink signal path 104, the comfort noise generator 198 can pass the noise contained in the signal 199 to the voice encoder 156 as the output signal 158, thereby providing comfort noise to indicate a communication session is still active. The comfort noise generator 198 can amplify or attenuate the noise based on the noise classification 194 to provide a desired comfort noise level.

Figure 2:
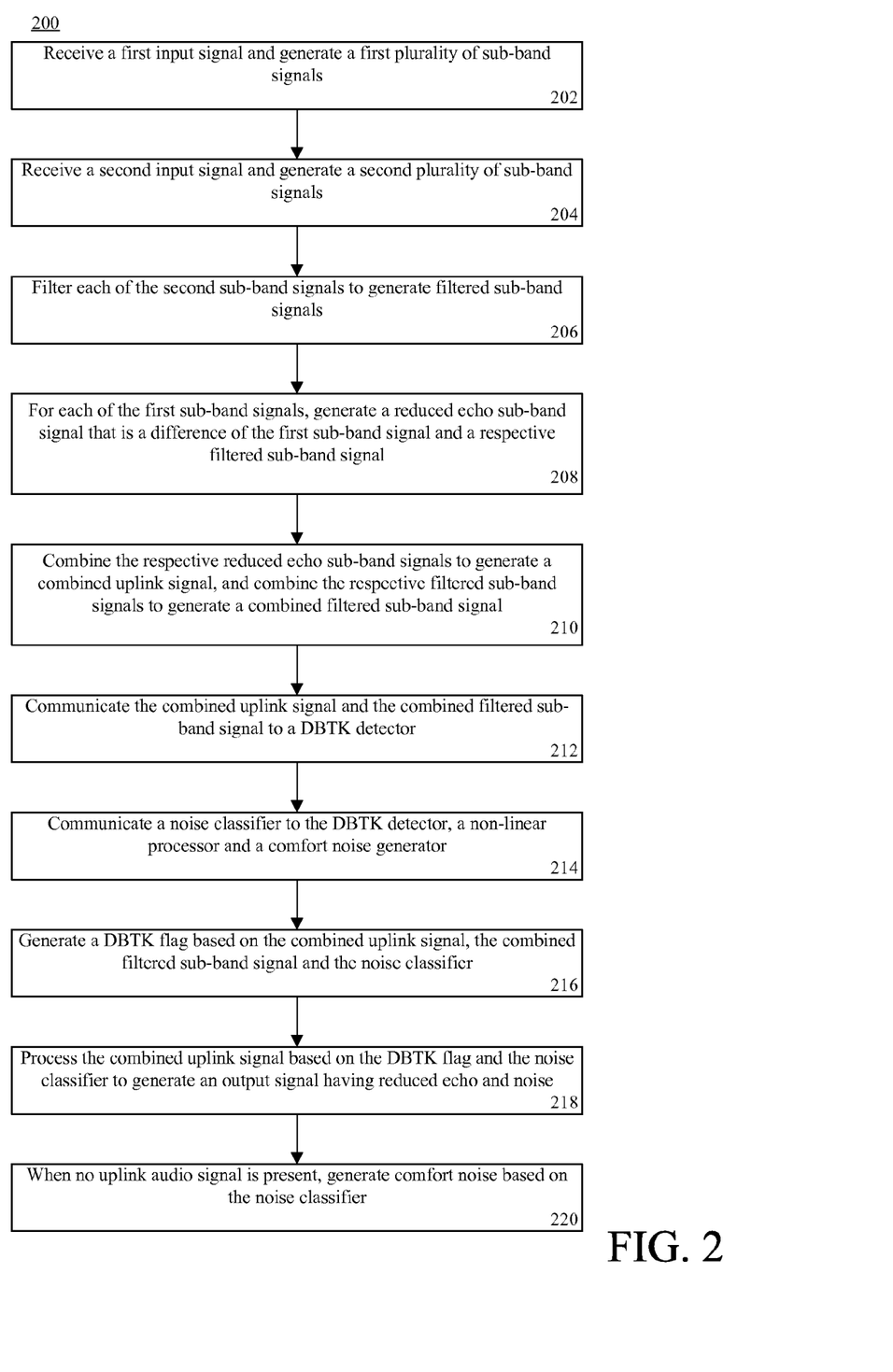
FIG. 2 is a flowchart presenting a method of implementing echo cancellation, which is useful for understanding the present invention.

FIG. 2 is a flowchart presenting a method 200 for implementing echo cancellation. At step 202, a first input signal can be received and from that signal a first plurality of sub-band signals can be generated. At step 204, a second input signal can be received and from that signal a second plurality of sub-band signals can be generated. At step 206 each of the second sub-band signals can be filtered to generate filtered sub-band signals. The filtering coefficients can be selected based on a respective DBTK flag.

Proceeding to step 208, for each of the first sub-band signals, a reduced echo sub-band signal can be generated. Each reduced echo sub-band signal can be a difference of a respective first sub-band signal and a respective filtered sub-band signal. At step 210 the respective reduced echo sub-band signals can be combined to generated a combined uplink signal. Further, the respective filtered sub-band signals can be combined to generate a combined filtered sub-band signal.

At step 212 the combined uplink signal and the combined filtered sub-band signal can be communicated to a DBTK detector. At step 214 a noise classifier also can be communicated to the DBTK detector, the non-linear processor and the comfort noise generator. As noted, the noise classifier can classify the amount of noise present on the uplink signal path.

Continuing to step 216, a DBTK flag can be generated. The DBTK flag can be based on the combined uplink signal, the combined filtered sub-band signal and the noise classifier. Generation of the DBTK flag is discussed in greater detail with respect to FIG. 4. Proceeding to step 218 of FIG. 2, the combined uplink signal can be processed based on the DBTK flag and the noise classifier to generate an output signal having reduced echo and noise. Referring to step 220, when no uplink audio signal is present, comfort noise can be generated based on the noise classifier.

Figure 3:
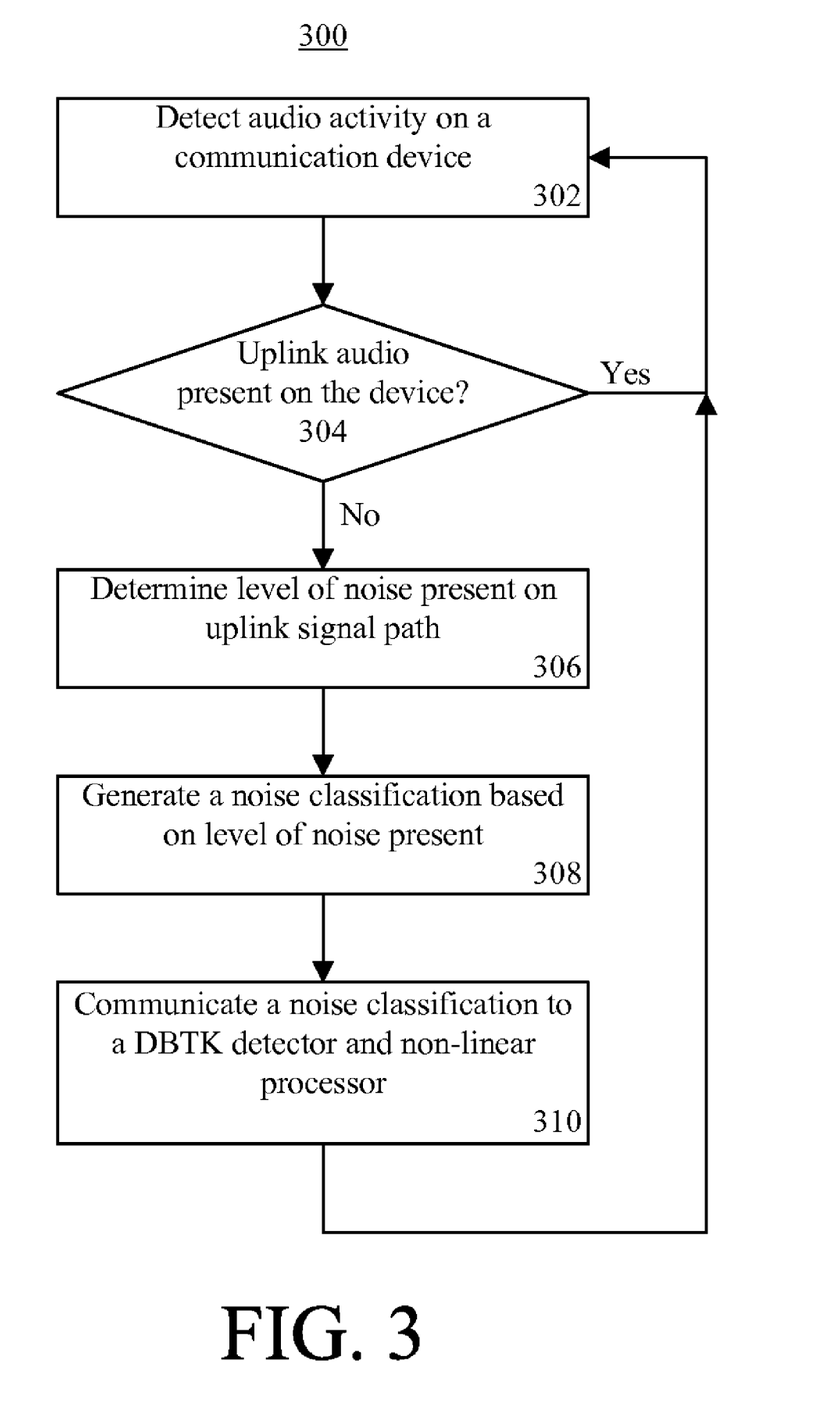
FIG. 3 is a flowchart presenting a method of classifying a noise level, which is useful for understanding the present invention.

FIG. 3 is a flowchart presenting a method 300 of classifying a noise level, which is useful for understanding the present invention. At step 302, audio activity on a communication device can be detected. For instance, a determination can be made whether uplink audio is present on the communication device. Proceeding to decision box 304, while uplink audio is present on the communication device, the process can return to step 302 and continue monitoring the audio activity on the communication device. If however, uplink audio is not detected on the communication device (e.g. on an uplink signal path), the process can proceed to step 306.

At step 306 a level of noise present on the uplink signal path can be determined. Continuing to step 308, a noise classification can be generated based on the level of noise present on the uplink signal path. At step 310, the noise classification can be communicated to a DBTK detector. Optionally, the noise classification also can be communicated to other components of the communication device, for example to a non-linear processor and/or to a comfort noise generator. Such components can process the noise classification as described herein.

Figure 4:
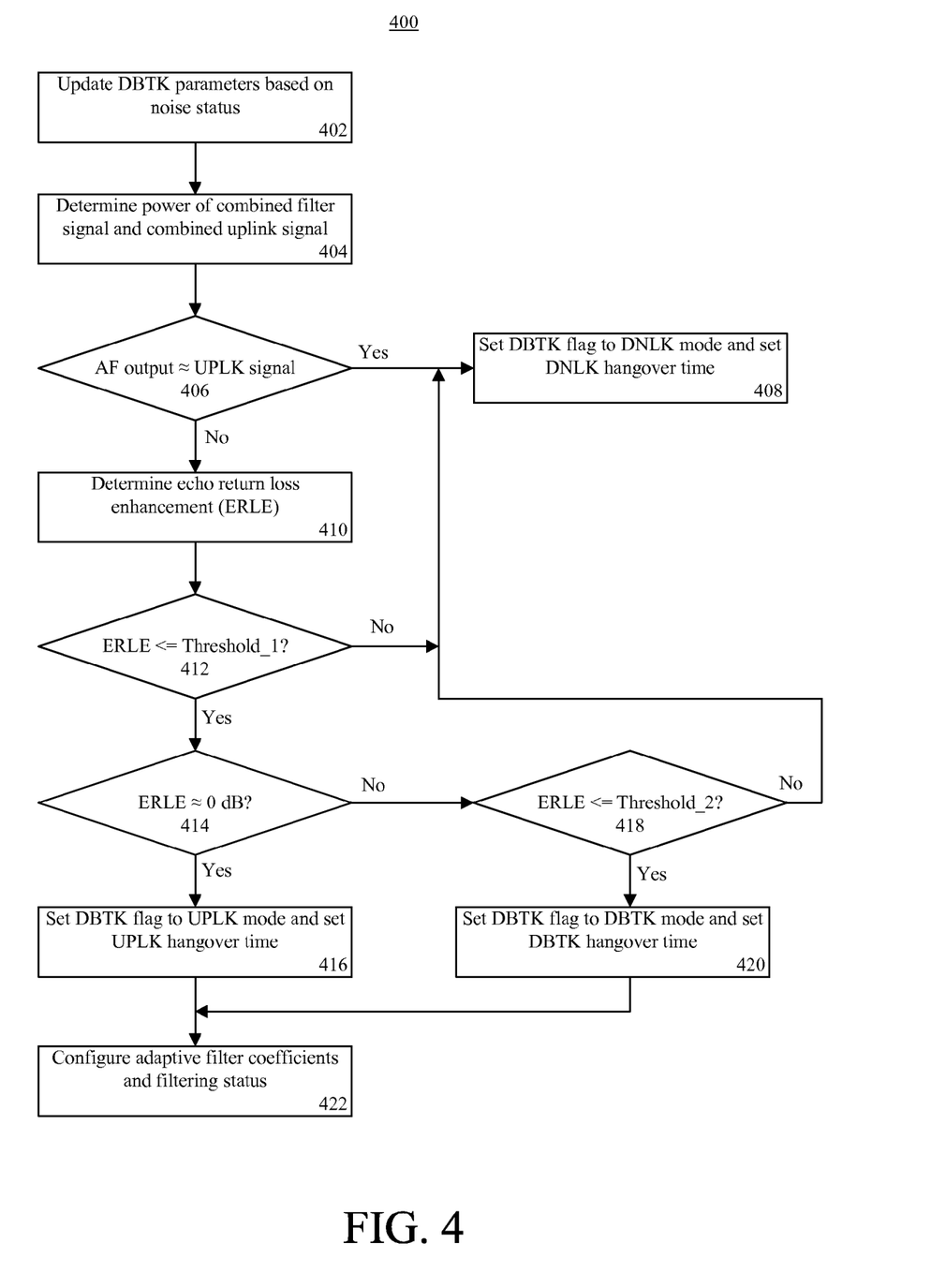
FIG. 4 is a flowchart presenting a method of selecting a double talk flag, which is useful for understanding the present invention.

FIG. 4 is a flowchart presenting a method 400 which can be implemented by each double talk detector to select a respective DBTK flag. At step 402, double talk parameters can be updated based on the noise classification provided by the noise environment classifier. The double talk parameters that are updated can include, for example, a threshold value for detecting whether an audio signal is present on the downlink signal path. For instance, if the noise classification indicates a low amount of noise on the uplink signal path, the threshold value can be set to a relatively low value. If, however, the noise classification indicates a high amount of noise on the uplink signal path, the threshold value can be set to a relatively high value. Any number of threshold values can be set based on the noise status, and the invention is not limited in this regard.

Continuing to step 404, the double talk detector can determine an output power of the combined filtered signal and the combined uplink signal. Proceeding to decision box 406, if the output power of the combined filtered signal is approximately equal to the power of the combined uplink signal, the process can proceed to step 408 and the DBTK flag can be set to indicate a downlink mode. In addition, a downlink hangover time can be set to a suitable value. The hangover time can be the amount of time the double talk detector maintains the DBTK flag at a particular value before allowing the DBTK flag can be changed. Limiting the frequency at which the DBTK flag can change in this manner can reduce the risk of the DBTK flag being changed due to erroneous signal detection.

If the active filter output power is not approximately equal to the uplink signal power, at step 410 an echo return loss enhancement value (ERLE) can be determined. The ERLE can be a ratio of the power of the combined output signal to the power of the echo signal.

Referring to decision box 412, if the ERLE value is not below a first threshold value, the method can proceed to step 408, where the DBTK flag can be set to indicate a downlink mode and a downlink hangover time can be set to a suitable value. If the ERLE value is below the first threshold value, the process can continue to decision box 414 and a determination can be made whether the ERLE is approximately equal to 0 dB. If the ERLE is approximately equal to 0 dB, the process can continue to step 416. At step 416, the DBTK flag can be set to indicate uplink mode and an uplink hangover time can be set to a suitable value.

If at decision box 414 the ERLE is not approximately equal to 0 dB, the process can proceed to decision box 418 and a determination can be made whether the ERLE is below a second threshold value. If so, at step 420 the DBTK flag can be set to indicate double talk mode and a double talk hangover time can be set to a suitable value. If the ERLE is not below the second threshold value, the process can proceed to step 408 and the DBTK flag and downlink hangover time can be set as previously described. Proceeding to step 422, the filter coefficients used by the adaptive filter and the filtering status can be updated based on the DBTK flag.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in a program storage device readable by a machine, tangibly embodying a program of instructions executable by the machine to perform methods and processes described herein. The present invention also can be embedded in an application product which comprises all the features enabling the implementation of the methods described herein and, which when loaded in a processing system, is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a MIDlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language).

This invention can be embodied in other forms without departing from the spirit or essential attributes thereof. Accordingly, reference should be made to the following claims, rather than to the foregoing specification, as indicating the scope of the invention.

What is claimed is:

1. An echo canceller, comprising:
  a noise environment classifier that detects a level of noise present on an uplink signal path and generates a noise classifier based on the level of noise;
  a double talk detector that:
    detects whether uplink audio is present on the uplink signal path;
    detects whether downlink audio is present on a downlink signal path; and
    generates a double talk flag based at least on the noise classifier, whether uplink audio is present on the uplink signal path and whether downlink audio is present on the downlink signal path;

a first multi-band filter that receives a first input signal and generates a first plurality of sub-band signals, each of the first plurality of sub-band signals comprising a respective sub-band of the first input signal;

a second multi-band filter that receives a second input signal and generates a second plurality of sub-band signals, each of the second plurality of sub-band signals comprising a respective sub-band of the second input signal;

a plurality of adaptive filters, each of the adaptive filters receiving the double talk flag and a respective one of the second sub-band signals, and filtering the second sub-band signal in accordance with the double talk flag to generate a filtered second sub-band signal;

a plurality of adders, each of the adders generating a respective third sub-band signal that is a difference of a respective one of the first sub-band signals and a respective one of the respective filtered second sub-band signals; and a non-linear filter that processes the double talk flag, the noise classifier and an uplink signal to generate an output signal having reduced echo.

2. The echo canceller of claim 1, wherein the noise environment classifier classifies the level of noise present on the uplink signal path into at least one noise classification selected from a plurality of defined noise classifications and the double talk detector bases the double talk flag on the selected noise classification.

3. The echo canceller of claim 1, wherein the non-linear filter selects an amount of attenuation to apply to the uplink signal based upon the double talk flag and the noise classifier.

4. The echo canceller of claim 1, further comprising an equalizer that equalizes the uplink signal.

5. The echo canceller of claim 1, further comprising a downlink signal processor that processes the double talk flag and the downlink signal to generate an adjusted downlink signal.

6. The echo canceller of claim 5, wherein the downlink signal processor adjusts the gain of the downlink signal based on the double talk flag.

7. The echo canceller of claim 5, wherein the downlink signal processor equalizes the downlink signal based on the double talk flag.

8. A method of cancelling echo in a duplex communication device, comprising:

detecting a level of noise present on an uplink signal path;

generating a noise classifier based on the detected level of noise;

detecting whether uplink audio is present on the uplink signal path;

detecting whether downlink audio is present on a downlink signal path;

generating a double talk flag based at least on the noise classifier, whether uplink audio is present on the uplink signal path, and whether downlink audio is present on the downlink signal path;

receiving a first input signal and generating a first plurality of sub-band signals, each of the first plurality of sub-band signals comprising a respective sub-band of the first input signal;

receiving a second input signal and generating a second plurality of sub-band signals, each of the second plurality of sub-band signals comprising a respective sub-band of the second input signal;

for each of the first sub-band signals, receiving the double talk flag and a respective one of the second sub-band signals, and filtering the second sub-band signal in accordance with the double talk flag to generate a filtered second sub-band signal;

for each of the first sub-band signals, generating a third sub-band signal that is a difference of the first sub-band signal and the respective filtered second sub-band signal; and processing the double talk flag, the noise classifier and an uplink signal to generate an output signal having reduced echo.

9. The method of claim 8, wherein:

generating a noise classifier comprises classifying the level of noise present on the uplink signal path into at least one noise classification selected from a plurality of defined noise classifications; and generating the double talk flag comprises basing the double talk flag on the selected noise classification.

10. The method of claim 8, wherein processing the double talk flag, the noise classifier and an uplink signal to generate an output signal having reduced echo comprises:

selecting an amount of attenuation to apply to the uplink signal based upon the double talk flag and the noise classifier.

11. The method of claim 8, wherein processing the uplink signal further comprises equalizing the uplink signal.

12. The method of claim 8, further comprising:

processing the double talk flag and the downlink signal to generate an adjusted downlink signal.

13. The method of claim 12, wherein processing the downlink signal comprises adjusting the gain of the downlink signal based on the double talk flag.

14. The method of claim 12, wherein processing the downlink signal comprises equalizing the downlink signal based on the double talk flag.

15. A method of cancelling echo in a duplex communication device, comprising:

detecting a level of noise present on an uplink signal path;

generating a noise classifier by classifying the level of noise present on the uplink signal path into at least one noise classification selected from a plurality of defined noise classifications;

detecting whether uplink audio is present on the uplink signal path;

detecting whether downlink audio is present on a downlink signal path;

generating a double talk flag based at least on the noise classifier, whether uplink audio is present on the uplink signal path, and whether downlink audio is present on the downlink signal path; and processing the double talk flag, the noise classifier and an uplink signal to generate an output signal having reduced echo.

16. The method of claim 15, further comprising:

receiving a first input signal and generating a first plurality of sub-band signals, each of the first plurality of sub-band signals comprising a respective sub-band of the first input signal;

receiving a second input signal and generating a second plurality of sub-band signals, each of the second plurality of sub-band signals comprising a respective sub-band of the second input signal;

for each of the first sub-band signals, receiving the double talk flag and a respective one of the second sub-band signals, and filtering the second sub-band signal in accordance with the double talk flag to generate a filtered second sub-band signal; and for each of the first sub-band signals, generating a third sub-band signal that is a difference of the first sub-band signal and the respective filtered second sub-band signal.

17. The method of claim 15, wherein processing the double talk flag, the noise classifier and an uplink signal to generate an output signal having reduced echo comprises:

selecting an amount of attenuation to apply to the uplink signal based upon the double talk flag and the noise classifier.

18. The method of claim 15, wherein processing the uplink signal further comprises equalizing the uplink signal.

19. The method of claim 15, further comprising:

processing the double talk flag and the downlink signal to generate an adjusted downlink signal.

20. An echo canceller, comprising:

a noise environment classifier that detects a level of noise present on an uplink signal path and generates a noise classifier based on the level of noise, wherein the noise environment classifier classifies the level of noise present on the uplink signal path into at least one noise classification selected from a plurality of defined noise classifications;

a double talk detector that:

detects whether uplink audio is present on the uplink signal path;

detects whether downlink audio is present on a downlink signal path; and generates a double talk flag based at least on the noise classifier, whether uplink audio is present on the uplink signal path and whether downlink audio is present on the downlink signal path, wherein the double talk detector bases the double talk flag on the selected noise classification; and a non-linear filter that processes the double talk flag, the noise classifier and an uplink signal to generate an output signal having reduced echo.

21. The echo canceller of claim 20, wherein the non-linear filter selects an amount of attenuation to apply to the uplink signal based upon the double talk flag and the noise classifier.

22. The echo canceller of claim 20, further comprising a downlink signal processor that processes the double talk flag and the downlink signal to generate an adjusted downlink signal.

* * * * *